2,701,232

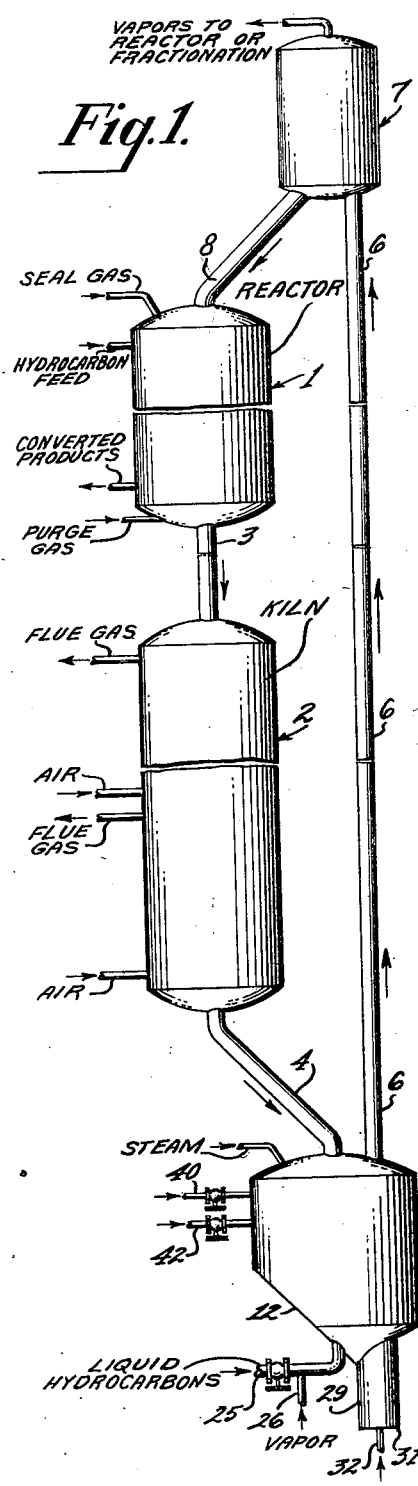
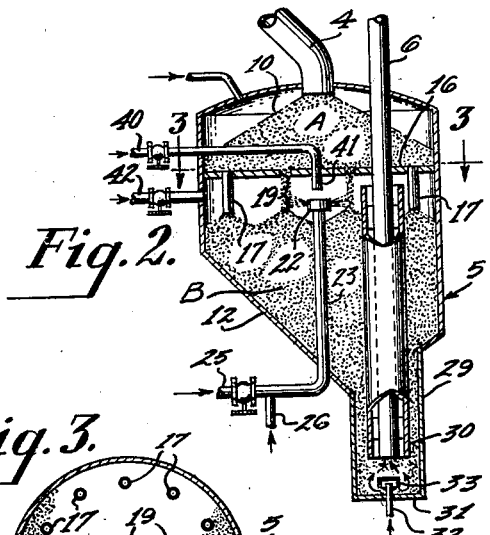
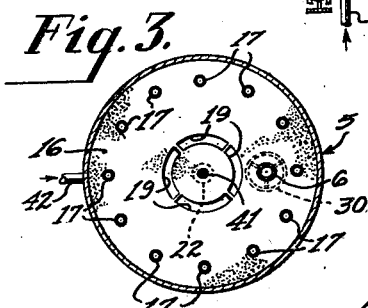
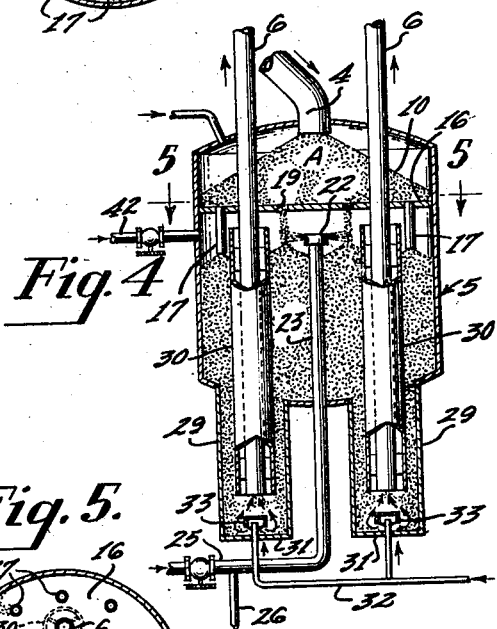
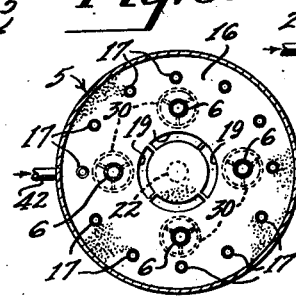
Feb. 1, 1955 — R. KOLLGAARD — 2,701,232
PROCESSING LIQUID HYDROCARBONS
Filed April 10, 1951
INVENTOR
Reyner Kollgaard
ATTORNEY United States Patent Office 2,701,232
Patented Feb. 1, 1955

PROCESSING LIQUID HYDROCARBONS

Reyner Kollgaard, Media, Pa., assignor to Houdry Process Corporation, Wilmington, Del., a corporation of Delaware Application April 10, 1951, Serial No. 220,200

11 Claims. (Cl. 196—52)

The present invention relates to apparatus for elevating solids in granular particle form, and more particularly to apparatus for elevating granular contact material, such as catalyst, in hydrocarbon conversion or cracking systems of the compact moving bed type, although not limited thereto.

By way of explanation, it may be stated that, in certain well-known hydrocarbon cracking and other hydrocarbon conversion systems, liquid hydrocarbons are vaporized and partially chemically converted by contact at reaction temperature with granular catalyst or other granular contact mass. The liquid hydrocarbons engage freshly regenerated catalyst or other hot contact mass in granular state in a vaporizing zone above a compact bed reaction zone. The contact mass descends and is thereafter accumulated to form a compact gravitating bed thereof below the vaporizing zone, and the hydrocarbon vapors derived from the contact vaporization of the liquid are then further converted or processed by being passed through the hydrocarbon conversion zone in contact with the descending compact mass and together with any additional hydrocarbon vapors desired to be converted or processed by contact with the compact bed of granular contact material.

Generally, the contact mass, such as catalyst, is circulated through a system including a hydrocarbon conversion zone, and through a regeneration zone wherein carbonaceous deposit formed therein during hydrocarbon conversion is burned, the regenerated catalyst being subsequently returned to the hydrocarbon conversion zone.

In the prior patented art concerning compact moving bed operations, there is disclosed the handling of liquid hydrocarbon feed, the liquid being sprayed onto the bed or onto either a curtain or a dispersion of catalyst above the compact bed proper. Considerable precaution must be taken to avoid deposition of coke on the walls of the reactor vessel and adjacent metallic parts in the solids free area above the bed. It has also been proposed in certain systems utilizing a hydrocarbon vapor lift, to inject liquid hydrocarbons into the moving catalyst within or immediately below the lift, precautions being taken to overcome the inherent coking problem.

It is among the objects of the present invention to provide an improved method and apparatus for effecting the vaporization of a liquid hydrocarbon charge by transfer of sensible heat from a freshly regenerated catalytic or other solid contact mass.

A further object of the invention is to provide an improved method and arrangement for contacting liquid hydrocarbons with hot solid contact mass, such as catalyst, obtaining desired uniformity of distribution of the liquid on the solid mass contacted thereby, while avoiding deleterious deposition or accumulation of coke on the walls of the reactor vessel or on other parts therein.

Other objects and advantages of the invention will be appreciated from the description which follows.

In accordance with the invention hydrocarbons in liquid state are contacted with a hot solid granular mass, such as catalyst, at suitable temperature, in an area provided above a compact bed of such mass within a solids supply zone communicating with the inlet to a vapor lift system, thereby effecting transformation of the liquid hydrocarbons to vapors, which vapors are employed in moving the granular mass into and transporting the same upwardly through the lift to a discharge zone located at a higher level.

In the description which follows reference is made to the accompanying drawings which illustrate particular forms of apparatus adapted to be used in the practice of the invention. In these drawings:

Figure 1 is an elevational view of a hydrocarbon conversion apparatus which employs an arrangement according to the present invention;

Figure 2 is an enlarged elevation, partly in section, of the lift hopper which is disposed at the bottom of the apparatus of Figure 1;

Figure 3 is a sectional view on the line 3—3 of Figure 2;

Figure 4 is a view which is similar to the view of Figure 2 but in which there is disclosed a modified form of the apparatus of the present invention; and Figure 5 is a sectional view on the line 5—5 of Figure 4.

Referring more particularly to Figure 1 of the drawings, the hydrocarbon conversion or cracking system shown therein comprises a reactor or conversion vessel 1 and a regenerating vessel or kiln 2 which is disposed therebelow and communicates therewith through a connecting conduit 3. The regenerating vessel or kiln 2 discharges at the bottom thereof into a downwardly depending conduit or seal leg 4 which communicates with the top of a lift transfer hopper generally designated at 5. A lift conduit 6 is disposed with its lower end below the top of the lift transfer hopper 5 and it extends vertically therefrom to a point which is above the top of the conversion vessel 1. The upper end of this lift conduit 6 communicates with a separating or disengaging vessel 7, the latter, in turn, communicating with the conversion vessel 1 by means of a downwardly depending connecting conduit 8.

According to the foregoing construction and arrangement, as applied to the catalytic cracking of a charge containing hydrocarbon liquids, for example freshly regenerated catalyst is discharged from the regenerator or kiln 2 and passes by gravity through the conduit 4 to the top of the lift transfer hopper 5, forming therein a bed which assumes a level which is determined by the normal angle of repose of the solid material, as indicated at 10 in Figure 2, the same being above the level of the bottom of the vertically rising lift conduit 6, as shown.

The lift hopper 5 is substantially cylindrical, except for an angularly inclined wall 12, in the embodiment of Figures 1 and 2, which assists the downward flow of solid particles in a manner, and for a purpose, which will be later described.

The lift hopper 5 is provided above its horizontal center-line, but in spaced relationship with respect to its top, with a tube sheet 16 having a plurality of downcomers 17 near the outer edges thereof, as shown most clearly in Figure 3. In addition, the tube sheet 16 is provided adjacent its center with an annular slot 19, through which a circular curtain of catalyst is discharged from the bed A which continuously forms on the tube sheet 16 from the material being fed through the conduit 4 from the bottom of the regenerator or kiln 2 as shown in Figure 2. Additional catalyst from the bed A is fed downwardly through the downcomers 17.

As a result of the feeding of the catalyst through the downcomers 17 and through the circular slot 19, there is formed beneath the tube sheet 16 a bed B of catalyst which is ultimately to be fed upwardly through the lift conduit 6 to the lift separator or disengager 7.

Within the circular curtain of catalyst which falls through the circular slot 19 of the tube sheet 16, there is disposed a spray device 22 which is constructed and arranged to eject onto the inner surface of said curtain atomized, or other finely divided particles of liquid hydrocarbons, or a mixture of liquid and vapors. This spray device 22 is mounted between the upper surface of the bed B and the lower surface of the tube sheet 16, and is supplied through a vertical conduit 23 which extends downwardly through the bed B and the lower portion of the inclined wall 12 of the housing of the lift hopper 5, being provided exteriorly of the latter with conduits 25 and 26. A liquid containing hydrocarbon is supplied to the conduit 25 while, if desired, steam and/or vapor hydrocarbons may be supplied to the conduit 26.

Referring to Figure 2, the bottom of the lift transfer hopper 5 is provided with a depending tubular extension 29 which is adapted to receive a suitably supported vertically disposed open-ended sleeve 30, the lower end of which terminates short of the bottom of said tubular extension. This open-ended vertically disposed sleeve 30 is adapted to receive in concentric relationship the lower end of the lift pipe 6.

As shown in Figure 2, the lower end of the lift pipe 6 terminates at approximately the same level as the lower end of the open-ended vertically disposed sleeve 30. Liquid hydrocarbons are discharged into contact with the circular curtain of hot catalyst thus effecting conversion thereof to vapors in the curtain and subsequently in the gravitating bed therebelow. These vapors are passed downwardly through the open-ended sleeve 30, being discharged at the bottom of the latter, after which they reverse their direction to pass upwardly into the lift pipe 6, together with catalyst which is picked up thereby in the path of the vapors below the mouth of said lift pipe.

Angularly inclined wall 12 and depending extension 29 have such form that the accumulation or retention of any substantial amount of contact mass subsequent to contacting such contact mass with the liquid hydrocarbons and prior to the admission of such contacted catalyst to the lift path is avoided.

While the description and illustration of the lift hopper thus far has concerned a dependent well 29, other construction is possible as long as it provides for the continual passage of the granular mass and has suitable cross-sectional area such that an adequate supply of such granular mass is available and is continuously supplied to the region adjacent the inlet to the lift conduit 6.

As shown in the drawings, dependent well 29 may have a suitable closure member or plate 31 through which extends a pipe 32 directed upwardly, generally in axial alignment, toward lift pipe 6. A suitable gas may be introduced through pipe 32 to pass upwardly through the granular mass toward the entrance to the lift pipe 6; this gas diffuses into the contact mass below the lift pipe and assists in moving the contact mass toward the inlet of lift pipe 6. The outlet of pipe 32 may be covered by a suitable cap or baffle 33, which if desired, may be suitably perforated to permit gas passage therethrough. Cap 33 not only prevents entry of solids into pipe 32 but also assists in the distribution of the gas admitted through pipe 32 and serves to provide a desired flow pattern of the solids entering the lift pipe.

If desired, a suitable gas, such as steam, may be introduced through line 40 to the discharge nozzle 41 positioned above the nozzle 22 and below plate 16. Such gas serves the purpose of providing a gaseous barrier or blanket, substantially preventing the passage of liquid hydrocarbons admitted thereunder to contact in coke forming manner, the metallic surfaces that may be exposed to migrating droplets of such liquid. Steam thus admitted admixes with the vaporized hydrocarbons within the plenum chamber below tube sheet 16 and thereafter passes through the open ended vertically disposed sleeve 30 as part of the lift medium. Provision is made at line 42 for introduction of auxiliary fluid, process steam or the like to augment the supply of lift medium produced in the plenum, or such fluid may comprise the lift medium in the event of temporary stoppage of liquid introduction through line 23 and nozzle 22.

The lift vapors, comprising vaporized hydrocarbons, after elevating the contact mass in lift pipe 6 are disengaged from the contact mass in vessel 7 and may thereafter pass to further treating or processing operations such as for example directly to reactor 1 for further conversion such as cracking. Additional hydrocarbons from any suitable source may be added thereto for conversion in the reactor. In some operations the separated contact mass from vessel 7 may be passed directly to a regeneration zone for removal of coke resulting from the vaporization step in transfer hopper 5.

In Figures 4 and 5, there is shown a modification of the transfer hopper adapted to the operation of a multiplicity of parallel vapor lifts. The embodiment thus illustrated operates in similar manner to the embodiment directed to a single lift path as hereinabove described. Thus, liquid hydrocarbons dispersed through nozzle 22 onto surrounding falling contact mass are vaporized by contact with the contact mass in the curtain and in the gravitating bed beneath. The vapors are disengaged in the plenum beneath tube sheet 16 and pass through the several open-ended tubular members 30, thus providing at least part of the lift medium operating to elevate the contact mass into and through the several lift paths 6. The construction of the lift hopper according to this and similar embodiments is, likewise, such that substantially all of the contact mass entering therein passes therethrough and into the lift paths in similar manner and for the same reasons as described above in connection with the embodiment employing a single lift path.

While transfer passage 19 has been shown and described as formed by an annular slot in tube sheet 16, it will be understood that other constructions or arrangements can be similarly employed to provide a substantially circumferentially complete annular curtain of catalyst below the tube sheet. Thus, the slot may be provided with a depending annular guide flange, or instead of the slot a circular pattern of depending pipes may be employed spaced sufficiently close together to avoid significant discontinuity in the annular curtain of catalyst at the level of intersection with the liquid stream discharged from head 22.

While there have been shown and described herein certain specific embodiments of the present invention, it will be readily understood that the invention is not to be limited exactly thereto, since various modifications may be made without departing from the scope of the invention as defined in the appended claims.

I claim:

1. The method of handling liquid hydrocarbons in a hydrocarbon conversion system circulating granular catalyst, which comprises discharging hot freshly regenerated catalyst at suitable temperature into a solids supply zone in communication with the inlet to a vapor lift, spraying hydrocarbons in liquid state onto a continuously descending body of the hot catalyst within said supply zone to effect vaporization of the liquid hydrocarbons by transfer of sensible heat from the catalyst, disengaging the hydrocarbon vapors thus produced and passing the same through a path out of contact with catalyst to a zone containing catalyst adjacent the said inlet to the vapor lift, and thereafter flowing the said hydrocarbon vapors into said lift together with catalyst picked up thereby, for transportation through said vapor lift.

2. In the conversion of hydrocarbons in contact with a granular contact mass, the method which comprises passing such contact mass in hot freshly regenerated condition into the upper region of a transfer zone to accumulate as a compact bed in said region, continuously discharging at least a portion of said contact mass from said region as a falling annular curtain and onto the surface of a second compact bed of said granular material spaced below the compact bed of said upper region thereby forming a plenum between said beds, spraying liquid hydrocarbons onto the internal periphery of said annular curtain, said liquid hydrocarbons being converted to vaporized hydrocarbons by contact with the granular mass of said curtain and within said second bed, disengaging said vaporized hydrocarbons at the upper surface of said second bed and collecting the disengaged vaporized hydrocarbons within said plenum, passing at least a major part of said vaporized hydrocarbons from said plenum to a lower region of said transfer zone to engage contact mass therein and effect elevation of such contact mass in said lower region, passing lift vapor including said vaporized hydrocarbons together with contact mass so elevated into and through a long laterally confined narrow path extending through said second and first beds to a disengaging zone, separating the lifting vapor from the contact mass in said disengaging zone, passing the contact mass from the disengaging zone by gravity to a regenerating zone wherein said contact mass is heated, and returning the thus heated contact mass to the upper region of said transfer zone.

3. In the process of elevating hot contact solids from a lift hopper with a lifting fluid comprising hydrocarbons, the method which comprises causing atomized liquid hydrocarbon material to pass into direct contact with said contact solids in said hopper thereby effecting vaporization of said liquid, separately passing said contact solids and vaporized hydrocarbons after said vaporization to a region adjacent the entrance to a pneumatic lift path, and elevating said solids from said region through said lift path with lifting fluid comprising said vaporized hydrocarbons.

4. In the process of elevating hot granular catalyst with a lifting fluid comprising hydrocarbon vapors, the method which comprises vaporizing liquid hydrocarbons by direct contact with hot catalyst in a lift hopper, separating vaporized hydrocarbons from said catalyst, separately passing vaporized hydrocarbons and said catalyst after vaporizing contact to a region within said hopper adjacent the entrance to a confined vapor lift path, and elevating said catalyst from said region through said lift path with lifting fluid comprising said vaporized hydrocarbons.

5. The method of converting hydrocarbons by contact with granular solid contact mass at conversion conditions; comprising in sequence and in cycle, introducing granular contact mass and liquid hydrocarbons to a lift hopper, converting said liquid hydrocarbons to vapor form by vaporizing-contact with said mass having vaporizing temperature, subsequently and separately transferring said mass and vaporized hydrocarbons to a region adjacent a transfer path entrance and transferring said mass by said hydrocarbons through said transfer path, thereafter separating said hydrocarbons and said mass, introducing said hydrocarbons and said mass to a conversion zone for further contact at conversion conditions, recovering converted hydrocarbons, passing said mass to a reheating zone, reheating said mass to said vaporizing temperature, and returning said heated mass to vaporizing contact with liquid hydrocarbons in said hopper.

6. The method of converting liquid hydrocarbons in a system circulating a granular contact material, which comprises introducing hot granular contact material into a transfer hopper, forming in an upper region of said hopper a compact bed of said granular contact material, discharging said material from the bottom of said compact bed as a substantially circumferentially complete curtain of said granular material freely falling to the surface of a second bed of said granular material established therebeneath, passing said material in said second bed by gravitation to the lower region of said hopper and effecting elevation of said solids into and through a vapor lift path by elevating contact with a lift medium comprising hydrocarbon vapors, introducing liquid hydrocarbons as an outwardly dispersed spray into contact with the internal periphery of said curtain, said contact effecting vaporization of said liquid by transfer of sensible heat in said solids to said liquid, collecting vaporized hydrocarbons and passing said hydrocarbons through a path out of contact with said solids to said lower region of said hopper to comprise said lift medium.

7. In a hydrocarbon conversion system having a downflow path and an upflow path and continuously circulating therethrough a contact solids mass which moves by gravity in the downflow path and by pneumatic elevation in the upflow path and having a lift hopper from which gravitating solids are elevated, said lift hopper being adapted for handling liquid hydrocarbons, apparatus comprising the lift hopper, means for introducing solids to said hopper, a transverse partition in said hopper in spaced-apart relation from the top thereof and in bed receiving and supporting relationship to said solids, passage means in said transverse partition, said passage means having annular form and being adapted to transfer a freely falling annular curtain of said solids, liquid dispersion nozzle means arranged below said partition for spraying the internal periphery of said curtain with liquid hydrocarbons, means below said nozzle for supporting and transferring a second gravitating bed of said solids in spaced relation to provide a plenum beneath said transverse member and above said second bed, gas passage means connecting said plenum to a lower region of said hopper, a vertical pneumatic lift pipe extending upwardly from said lower region through said lift hopper, and means for feeding solids from said second gravitating bed to said lower region.

8. A lift hopper for hydrocarbon conversion apparatus comprising a partition constructed and arranged to create a downwardly falling circular curtain of granular material, means below said partition for receiving a bed of granular material formed by said downwardly falling circular curtain, liquid spraying means disposed within said downwardly falling circular curtain arranged for spraying the interior thereof with a liquid, said lift hopper having a depending well, a tubular sleeve disposed in said well and adapted to extend above the level of the bed of granular material under said partition, and a lift pipe extending upwardly to an elevated lift separator, the lower end of said lift pipe being disposed concentrically within said tubular member.

9. A lift hopper for hydrocarbon conversion apparatus comprising a partition constructed and arranged to create a downwardly falling circular curtain of granular material, means below said partition for receiving a bed of granular material formed by said downwardly falling circular curtain, liquid spraying means disposed within said downwardly falling circular curtain, said lift hopper having a depending well, a tubular sleeve disposed in said well and adapted to extend above the level of the bed of granular material under said partition, a lift pipe extending upwardly to an elevated lift separator, the lower end of said lift pipe being disposed concentrically within said tubular sleeve, and fluid supply means disposed beneath said tubular sleeve and the lower end of said lift pipe for assisting the elevation of granular material into the latter.

10. In a hydrocarbon conversion system provided with a reactor for contacting liquid hydrocarbons with a granular mass, together with means for regenerating said mass, a lift hopper for receiving the regenerated granular mass, said lift hopper comprising a partition constructed and arranged to create a downwardly falling circular curtain of granular material, means below said partition for receiving a bed of granular material formed by said downwardly falling circular curtain, means disposed within said downwardly falling circular curtain for spraying the interior thereof with a liquid, said lift hopper having a depending well, a tubular sleeve disposed in said well and adapted to extend above the level of the bed of granular material under said partition, and a lift pipe extending upwardly to an elevated lift separator, the lower end of said lift pipe being disposed concentrically within said tubular member.

11. In a hydrocarbon conversion system provided with a reactor for contacting liquid hydrocarbons with a granular mass, together with means for regenerating said mass, a lift hopper for receiving the regenerating granular mass, said lift hopper comprising a partition constructed and arranged to create a downwardly falling circular curtain of granular material, means below said partition for receiving a bed of granular material formed by said downwardly falling circular curtain, means disposed within said downwardly falling circular curtain for spraying the interior thereof with a liquid, said lift hopper having a depending well, a tubular sleeve disposed in said well and adapted to extend above the level of the bed of granular material under said partition, a lift pipe extending upwardly to an elevated lift separator, the lower end of said lift pipe being disposed concentrically within said tubular member, and means disposed beneath said tubular sleeve and the lower end of said lift pipe for assisting the elevation of granular material through the latter.

References Cited in the file of this patent

UNITED STATES PATENTS

| | | |
|---|---|---|
| 2,463,623 | Huff | Mar. 8, 1949 |
| 2,492,999 | Lassiat | Jan. 3, 1950 |
| 2,561,409 | Ardern | July 24, 1951 |
| 2,587,669 | Weinrich | Mar. 4, 1952 |

OTHER REFERENCES

"Commercial T. C. C. Operation on Partially Vaporized Charge Stocks," by Noll et al. Houdry Pioneer, vol. 2, No. 1, pages 1–3, October 1946.